Feb. 23, 1937. G. K. GEERLINGS 2,071,926
TEAR RESISTANT PRODUCT AND METHOD OF PRODUCING SAME
Filed Aug. 28, 1933

Gerald K. Geerlings
INVENTOR

BY Albert Sperry.
ATTORNEY

Patented Feb. 23, 1937

2,071,926

UNITED STATES PATENT OFFICE 2,071,926

TEAR-RESISTANT PRODUCT AND METHOD OF PRODUCING SAME

Gerald K. Geerlings, Bala-Cynwyd, Pa.

Application August 28, 1933, Serial No. 687,047

5 Claims. (Cl. 154—46)

My invention relates to products such as regenerated cellulose, gelatin and resinous or other sheet materials which are flexible and in many instances transparent, and which, when torn, are characterized by a smooth non-crystalline and non-fibrous tear, similar in form to the broken edge of glass or other amorphous materials, in contrast to the torn edge of materials such as paper, parchment and the like, which are of a fibrous nature and when torn present an irregular or fibrous edge. My invention is particularly directed to products having the characteristics of regenerated cellulose, in which means are provided serving to prevent or limit the tearing of the material. The means employed may take various forms and may also serve to improve the appearance, texture and durability of the material.

It is well known that regenerated cellulose and similar materials, such as gelatin, vinyl acid compounds and the like, are tough and resistant to puncture. However, when a tear is once started in such materials it is almost impossible to limit or direct the tearing thereof. This characteristic of materials, of which regenerated cellulose is typical, greatly limits the uses to which the materials may be put. For instance, when the material is used as either the inner or outer wrapper for packages it is often desirable to remove a comparatively limited portion or area of the material at the top or on one corner of the packages. However, wrappers formed of regenerated cellulose and the like when torn continue to tear without appreciable resistance or control until the tear reaches the opposite or another edge of the wrapper. For this reason the use of regenerated cellulose and similar materials for package wrappers is often objectionable and it has been impossible in many instances to use such materials for forming completed packages without the use of an inner container which will resist being destroyed when the outer cellulose wrapper is removed.

It has also been suggested that regenerated cellulose and materials of this character be used in making window shades supported on rollers, and for curtains, draperies and other interior decorating purposes. However, the tendency of the material to tear has prevented such use. Furthermore, these materials are usually uniform in color and although attempts have been made to print on such materials the results obtained are unsatisfactory for the purposes of interior decorating. Because of the light weight and flexible nature of materials of the character of regenerated cellulose it is also desirable for many purposes that some agent be applied thereto to prevent wrinkling and to give body to the product, especially when the material is to be used on rolls as window shades or in making comparatively heavy and durable products, such as draperies, hangings, lamp shades, etc.

Regenerated cellulose and materials of similar character are also adapted for use in roll form similar to the roll wrapping paper employed in drug and department stores, but the difficulty in tearing off the desired amount of material from a roll without leaving an irregular edge to the sheet, has prevented such use.

I have discovered that those materials, of which regenerated cellulose is typical, can be prevented from tearing, or that after tearing has begun the amount and direction in which the material is torn can be controlled, by applying a tear-resisting agent to the material. The tear-resisting agent may be in the form of one or more threads, filaments, layers, or strips of material, located either adjacent to the edge of the material or so positioned as to limit and direct the tearing thereof. Products embodying my invention are therefore adapted for use wherever the material is to be subjected to continuous use and wear. My invention is also applicable to the production of packages in which a portion only of the package is removed when opening the same. I may also use products embodying my invention for bulk wrapping material in the form of a roll from which any desired length of the material may be torn. This is particularly useful when the product is employed as a substitute for roll wrapping paper, where a lighter material is of advantage, as in air mail wrapping.

Products embodying my invention may have varied weights and flexibility, ranging from that of the usual flexible product to comparatively heavy materials of the character of light cardboard. The products may also have varied decorative appearances which are in marked contrast to regenerated cellulose and similar materials when used by themselves.

For these reasons the materials heretofore referred to as "tear-resisting agents" may in many instances be used primarily for the purpose of improving the quality and appearance of the material, or to give body thereto. In these cases the tear-resisting properties of the agent used may be of secondary importance.

Although I may apply the tear-resisting agent to only a single layer of regenerated cellulose or the like, I have found that ordinarily the best results are obtained when the tear-resisting material is placed between two layers of regenerated cellulose, or other material, so as to be firmly held in place when the material is torn.

One of the objects of my invention is to prevent the tearing of materials of the type of regenerated cellulose.

Another object of my invention is to limit or direct the tearing of such materials.

A further object of my invention is to provide means adapted to be applied to materials having the characteristics of regenerated cellulose for preventing or limiting tearing thereof.

A further object of my invention is to provide a laminated product formed of a plurality of sheets of material, such as regenerated cellulose, having an agent between the laminae for limiting or preventing the tearing of such materials.

Another object of my invention is to provide a flexible, transparent sheet formed of such material as regenerated cellulose, and having a tear-resisting agent applied thereto.

A further object of my invention is to provide an attractive article of manufacture comprising regenerated cellulose, or other material having like tearing characteristics, and which is resistant to, or capable of, limited tearing only.

These and other objects and features of my invention will appear from the following description thereof, in which reference is made to the accompanying figures of the drawing illustrating typical embodiments of my invention.

Figure 13:
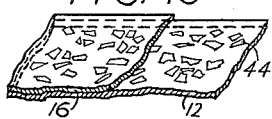
Figure 14:
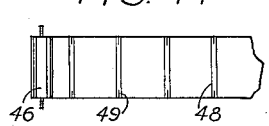
Figure 15:
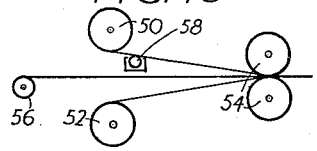
Figure 16:
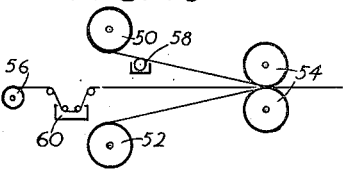
Figure 17:
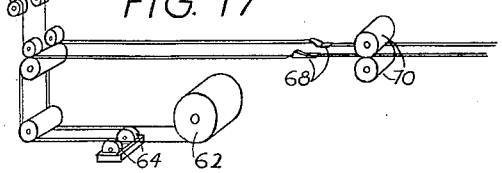

Figs. 6, 7, 8, and 9 illustrate alternative forms of my invention;

Figs. 10, 11, 12, 13, and 14 illustrate further alternative forms of my invention wherein a plurality of tear-resisting means are employed, and Figs. 15, 16, and 17 are diagrammatic illustrations of apparatus adapted for use in producing products embodying my invention.

Figure 1:
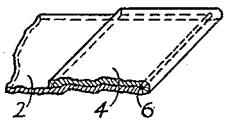
Fig. 1 is a diagrammatic view partly in section of a sheet of material embodying my invention.

The form of my invention illustrated in Fig. 1 comprises a sheet 2 composed of material such as regenerated cellulose, gelatin, etc. having a marginal portion 4 thereof folded back upon the sheet and provided with a thread 6, or other tear-resisting agent such as flexible wire of a similar filament, extending along the folded edges of the material between the sheet 2 and the portion 4 thereof so as to prevent tearing of the material. The thread or filament 6 is much stronger than the material of which the sheet is composed and can only be broken by the application of considerable force. The double thickness of the sheet at the edges thereof also contributes to the durability and resistance to tear of the resulting product. For this reason, material formed as illustrated in Fig. 1 is suitable for many uses wherein ordinary regenerated cellulose or the like would be altogether unsatisfactory.

The folded portion 4 of the material may be secured to the sheet 2 in any suitable manner, such as by means of an adhesive, or by combined heat and pressure which serves to "weld" the layers of material together. The manner of securing the folded portion 4 to the sheet 2, and the manner of securing the tear-resisting agent in place, may be varied as desired, and will depend upon the character of the sheet material and of the tear-resisting agent employed. Ordinarily, I prefer to use an adhesive and to secure the folded portion of the material to the sheet 2 throughout the entire overlapping area thereof. In some instances, the tear-resisting agent may have adhesive applied thereto before application to the sheet even though the sheet itself is coated with an adhesive throughout that portion thereof which is of double thickness.

After placing the thread 6, or other tear-resisting agent, upon the sheet, the portion 4 is secured to the sheet by adhesive or welding and the sheet subjected if desired to any drying, printing, cutting or other operations desired.

Figure 2:
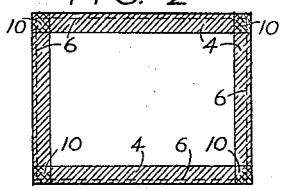
Fig. 2 is a plan view of a sheet such as that shown in Fig. 1.

As shown in Fig. 2 the threads 6 may be located adjacent the edges of the sheet on all four sides thereof. When used for draperies, curtains, or similar purposes, the latter construction will usually be preferable. However, the thread, or other tear-resisting agent, may be applied to only one or two margins of the sheet if preferred.

While I have shown and described the invention with only a relatively small portion 4 of the sheet folded back upon sheet 2, the portion 4 may extend over any desired portion of the sheet, or may even be co-extensive with sheet 2. In some instances, especially where it is desirable to have the resulting product relatively heavy, the latter construction may be preferred, whereas if a product which is light in weight and relatively flexible is desired, the folded portion 4 may be relatively narrow.

In the construction shown in Figs. 1 and 2, the use of regenerated cellulose or other materials, which while colored are also more or less transparent, results in a very attractive product. As shown by the shading in Fig. 2 the edge or marginal portion of the material, where the folded portion 4 overlies the sheet 2, is of darker color than the remainder of the sheet due to the double thickness of the transparent colored material. In the corners 10 of the sheet the material may be folded so as to provide four thicknesses or layers of colored material. In this way a product is obtained wherein the body of the sheet 2 is of one shade, the marginal portions 4 are of a darker shade, and the corners 10 are of a still darker shade. I may thus produce an attractive article having a decorative border of deeper color and decorative appearance coincident with reenforcing the margins. This result is obtained without resorting to the use of additional means to produce the decoration on the sheet.

In the foregoing constructions I frequently prefer to use tear-resisting agents which are relatively unnoticeable, and for this purpose a marginal thread of cotton, silk or linen is preferred, although other materials, including flexible wire or other filamentary material may be used. If the presence of a wide band at the edges or margins of the material is not objectionable, or is desired, I may use any suitable flexible material, such as a woven tape, a strip of metal foil, or even a strip of regenerated cellulose or material similar to that from which the sheet is made. When using regenerated cellulose, or similar material, as the tear resisting agent, I prefer to fold the same so as to form a strip or the like which presents a folded edge toward that portion of the material which is to be torn or which is subjected to the greatest tendency to tear. It is well known that material such as regenerated cellulose is much more difficult to tear if the edge thereof is folded and, therefore, folding of the material when used as a tear resisting agent renders it particularly useful.

In the forms of my invention described above, the tendency for the material from which the sheet is formed to tear, is resisted by the thread. Since the material itself is tough, and tears, which usually start in the edge of the sheet, are prevented from starting, the life and usefulness of the material is thereby greatly increased.

Figure 3:
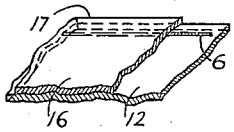
Fig. 3 is a diagrammatic view of an alternative form of manufacture embodying my invention.
Figure 4:
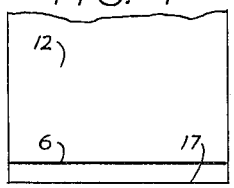
Fig. 4 is a plan view of a sheet of material constructed as shown in Fig. 3.

In Figs. 3 and 4 of the drawing, I have shown a construction embodying my invention which is especially adapted for uses wherein it is desirable to control or limit the tearing of material having the character of regenerated cellulose. One important use for such materials is in package wrappers, where the product is formed with either as an inner or an outer paper or cardboard wrapper. By the use of this form of my invention it is also possible to produce a durable package formed wholly of regenerated cellulose or the like and capable of being opened without destruction of the package. The purpose of this form of my invention is to permit the top or a corner of the package to be removed without entirely destroying the package or wrapper, as in the case of a cigarette package.

In order to enable the material to be torn a limited and predetermined extent only, a sheet of material 12 is provided with a thread 6 spaced inwardly from the edge 14 of the material which is to be torn. A second sheet of material 16 is then placed over the sheet 12 and over thread 6. The laminae making up the sheet, as well as the thread or other tear-resisting agent used, are secured together by means of welding, the use of adhesive material, or in any other suitable manner. The thread 6 is suitably positioned to prevent tearing of the material further than desired, in the direction from edge 17 toward the thread 6. The tear-resisting agent may extend transversely across the sheet as shown in Fig. 4, or may be applied in any other manner to limit the area of the sheet, or that portion of the wrapper, which is to be removed or torn away in opening the package.

Figure 5:
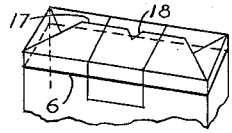
Fig. 5 is a perspective of a package having a sheet of material such as that illustrated in Fig. 4 applied thereto as a wrapper.

As shown in Fig. 5 such a sheet may be applied to a cigarette package as the outer moisture-proof covering therefor. When so used the wrapper preferably is positioned about the package with the thread 6 located slightly below the top thereof in order to enable one corner of the top of the wrapper to be removed without removing the wrapper altogether, and without producing an unsightly and irregular tear. A notch 18, or short cut, may be formed in the edge of the material to facilitate starting of a tear in the material, if desired. With this construction the package may be opened very readily by grasping the free edge thereof adjacent the notch 18 and raising the material. As in the usual construction the wrapper tears easily until it reaches the thread 6. Then instead of continuing on in an uncontrolled fashion the material tears neatly along the thread 6 about the corner of the package leaving that portion of the wrapper below the thread 6 intact. The package therefore retains its attractive appearance and much of its moisture-proofing qualities.

Figure 6:
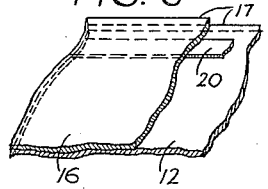

Although I have referred to the tear-resisting agent above as a thread, my invention is not limited to the use of a thread or filament for this purpose. As shown in Fig. 6 a relatively wide strip of material 20 may be used in place of the thread 6 for preventing tearing of the material beyond a predetermined line or limit in the same manner as the thread 6 of Figs. 4 and 5. If such a strip is placed adjacent and parallel to the edge of the material it may serve to prevent any tearing of the sheet whatever in the same manner as the thread 6 of Figs. 1 and 2.

Figure 7:

In Fig. 7 I have shown a sheet having a woven tape 22 positioned adjacent the edge thereof to prevent tearing of the material. A tape serves in the same manner as the thread 6 to prevent or limit tearing of the material and has the additional advantages or relatively great strength and large area for attachment to the sheet material. The tape may, if desired, be spaced inwardly from the edge of the sheet in the same manner as the thread of the form of my invention shown in Fig. 4 in the event it is desired that the material be permitted to tear to a limited or predetermined extent only.

The products illustrated in Figs. 1, 3, and 5 are formed with the tear-resisting agent positioned between adjacent layers of the sheet material. However, products embodying my invention may also be produced by applying the tear-resisting agent to the exposed face of a single sheet in the manner shown in Fig. 7 of the drawing. This construction is especially adapted for use with tearing agents in the form of relatively wide bands or webs providing a large surface for securing the agent to the sheet material. In any case the tear-resisting agent may be fixed in position by means of adhesives, or by subjecting the sheet to heat and pressure, or otherwise as desired. Generally however I prefer to position the tear-resisting material between adjacent layers or laminae of a laminated sheet in order to prevent dislocation of the tear-resisting agent, and to insure a firm bond between the sheet and the agent.

Figure 8:
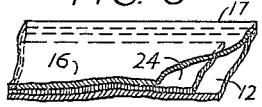

In view of the difficulty in starting a tear in material such as regenerated cellulose especially at a folded edge thereof the tear-resisting agent used may, in some cases, be regenerated cellulose itself, or other like material. As shown in Fig. 8 a product embodying my invention may be made up of upper and lower sheets 12 and 16 respectively, with an intermediate layer of similar material 24 spaced inwardly from and parallel to the edge 16. Upon tearing a sheet of this character the edge of the intermediate layer or sheet 24 functions in the same manner as the thread, tape or other tear-resisting agent in the forms of my invention described above. If the sheet 24 is folded or presents a folded edge in the direction from which the material is to be torn, or if the sheet 24 is of greater thickness, or formed of heavier or tougher material, than the sheets 12 and 16, the resistance to tearing is obviously greater than if sheet 24 is very thin. A very satisfactory material for forming the wrappers for packages and for other purposes is thereby produced without resorting to the use of threads, or bands of material differing in appearance or characteristics from that of which the sheet itself is formed. In this way I may produce a sheet of material having a tear-resisting agent therein which is practically invisible.

Figure 9:
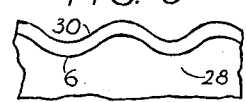

The tear-resisting agent need not follow a straight line or have a straight edge, and as shown in Fig. 9 a sheet of material 28 with a scolloped or irregular edge 30 may be provided with a tear-resisting thread 6, or other form of tear-resisting agent following the scolloped edge of the sheet. As shown the thread 6 is spaced a uniform distance inwardly from edge 30 of the sheet. However it may, of course, extend in any desired direction or it may be positioned directly adjacent the edge of the sheet if desired. The tear-resisting agent need not be a thread but may take various forms. If desired, the tear-resisting agent may be formed of a material similar to that from which the sheet itself is made, as in the type of product described in connection with Fig. 8.

Those forms of my invention in which the tear-resisting agent is similar in character to the material from which the sheet is formed lend themselves very readily to use for decorative purposes. For example in the form of my invention illustrated in Fig. 8 the intermediate tear-resisting layer 24 may be of a different color from that of the upper and lower layers 12 and 16, so that the edge of the product is of one color and the body of a different or contrasting color. Furthermore, the intermediate layer may be printed, stamped or cut with designs, printed matter or trademarks therein to give an attractive appearance to the material or adapt the same for commercial or advertising purposes. If the upper and lower layers 12 and 16, as well as the intermediate layer 24 are clear and transparent a design cut in the intermediate layer will have the general appearance of a water-mark. If the layers are all formed of transparent material of the same color, the cut out portion will appear in the product as an area of lighter color, due to the presence of only two layers of material in some areas and three layers of material elsewhere. By using an intermediate colored layer with transparent upper and lower layers it is possible to produce articles or packages with conspicuous designs or notations thereon, or to provide a window through which the contents of a package may be seen, without the use of any additional wrapping material. When using two or more intermediate layers 24, very interesting and attractive designs may be made by employing layers of different colors having complementary cut out portions of a design therein. In this way striking and very pleasing, artistic effects may be obtained in the practice of my invention.

Somewhat similar design effects may be obtained when using colored transparent material in the form of my invention shown in Fig. 1. This result may be obtained by cutting or stamping designs in the overlapping portion 4 of the material. By extending the portion 4 throughout a substantial area of the sheet and providing cut out designs therein, those portions of the sheet wherein the design is formed will be of a single thickness and of relatively light color, whereas the remainder of the sheet, where the portion 4 is present, will be of double thickness and of darker color.

Figure 10:
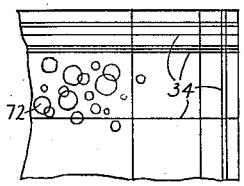
Figure 11:
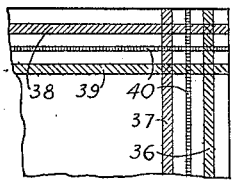

In each of the foregoing forms of my invention the tear-resisting agent is in the form of a single thread, tape, strip or sheet of material. However, in many instances it is desirable to provide tear-resisting agents, or means extending throughout the sheet, or distributed more or less regularly throughout the sheet, in the form of a plurality of threads or other means. As shown in Fig. 10, a number of spaced threads 34 are provided. These may extend both longitudinally and transversely across the sheet or in any other direction, as desired. The threads may be loosely woven together prior to applying the same to the sheet material, or they may simply be placed upon the sheet in the desired positions or arrangement without previous weaving. This construction is particularly adapted for forming attractive curtains or draperies, and may be used in producing distinctive wrapping materials, etc. Colored threads, or a combination of threads and strips of material of different colors, may be used. In this way colorful designs may be produced by using overlapping or woven strips of colored transparent material of the same or different width and colors. As shown in Fig. 11 the strips may be applied in a plaid-like arrangement with broad strips 36 and 37 extending in one direction and other strips 38 and 39 positioned at right angles thereto. Thus if the strip 36 is blue, strip 37 green, strip 38 yellow and strip 39 red the overlapping areas where the variously colored strips cross will be green, purple, yellow-green and brown. If in addition to these colored strips one or more narrow intermediate strips 40 of contrasting color are used, the color variations obtained may be greatly increased. Much the same effect may be obtained by using colored threads without greatly limiting the transparency of the product. A particular advantage inherent in the use of a number of threads, strips or other forms of tear-resisting agents in products of this character resides in the increased "body" or weight given to the material. This is especially useful in preventing buckling, warping or sagging of the material when used in articles such as window shades, curtains, or draperies, and serves to enable the material to withstand long continued service without deterioration.

Figure 12:
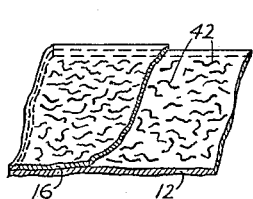

The arrangement of the strips, thread or other tear-resisting material within the sheet may in some cases be irregular as in the structure shown in Fig. 12 wherein fibers 42 such as cotton, wool flock, asbestos fibers, or other material is scattered loosely over the sheet or otherwise distributed throughout the same, so as to enhance the appearance of the product as well as greatly increasing the resistance to tearing and the "body" thereof.

Similarly, as shown in Fig. 13, material in flake of sheet form, such as flakes of mica 44 or other material which is not sufficiently bulky or irregular in shape as to roughen the surface of the material or tend to puncture the same, may be introduced between the layers of a laminated sheet so that a very attractive product is produced. This form of my invention is especially adapted for use in making lamp shades, draperies, table covers, etc. The mica or other material serves to prevent tearing of the sheet and gives body to the product without increasing the thickness of the upper and lower sheets of material used in forming the product to such an extent that the cost of the product is prohibitive. Ordinarily, however, when using a material such as mica, or when employing a plurality of threads, strips or other tear-resisting means, the thickness of the laminated sheet may be somewhat greater than when the product is used as wrapping material or for similar purposes.

In Fig. 14, I have shown an application of my invention for use in roll form as bulk wrapping material. In this form of my invention I preferably provide a roll of material 46 provided throughout its length with transversely extending threads 48. These threads are preferably arranged in pairs separated from each other by a short distance. Slits 49, for permitting ready tearing of the material, are located in the edges of the sheet between the threads 48 so that the material may be torn from the roll in a straight line between the pairs of threads. In this way a straight, neat wrapping end for the wrapping material is secured without the use of cutting implements. Each end of the sheet removed carries a single thread and thus tearing of the sheet during or after wrapping is also prevented. The pairs of threads may be located at spaced intervals along the sheet, say every six inches, and the desired length of the material may be easily torn off from the roll in the usual manner of tearing paper from rolls thereof. In some instances a single thread may be sufficient to insure the proper tearing of the material, especially if a weighted tear defining member is mounted on the support for the roll, as in the usual roll paper support.

In each of the foregoing forms of my invention, and especially in those forms thereof wherein a plurality of threads, strips or other tear-resisting means are employed, the appearance of the product will be greatly improved. In fact, the primary purpose in the use of such threads or other means may in some instances be to provide an attractive or decorative product, resistance to tear being of secondary importance in some cases. In utilizing my invention it may be desirable in some instances to select and position the tear-resisting agents in order to take advantage of their appearance or ability to prevent sagging or wrinkling of the material, or for other properties possessed thereby, rather than for their ability to resist or prevent tearing of the material. The material of which the tear-resisting agents are formed, the arrangement and location thereof in the material, and the color and shape thereof will therefore in each case depend upon the purpose for which the resulting product is to be used.

While products embodying my invention may be made in any suitable or convenient manner, one illustrative method of producing material in accordance with my invention is shown in Fig. 15. In this process an upper roll of material 50 is provided and a second or lower roll 52 of the same or other suitable material is used. Webs of material from the rolls 50 and 52 are passed between press rolls 54 and pass on to any suitable, drying, cooling, printing, or other operation as desired. A spool of thread, tape or other suitable tear resisting agent 56 is located between the rolls 50 and 52, and the thread is passed into contact with the webs of material as they pass between press rolls 54. Adhesive material may be applied to the lower face of the upper web by means of a coating roll 58 in order to make the webs of material adhere to each other, and to prevent the thread or other tear-resisting agent from being displaced in the sheet. While I prefer to use an adhesive for securing the sheets or webs of material together to produce a laminated product, solvent or softening means may be applied by the coating roll if preferred. The webs of material may then be brought together under pressure and dried or cooled to insure firm adhesion of the two layers of material to form a laminated sheet. The press roll 54 may be heated if desired, and in some instances the process may be carried out by welding the webs of material together by the action of heat and pressure without the use of any adhesive.

As shown in Fig. 16 the tear-resisting agent itself may be coated with adhesive material by passing it from the spool 56 through a bath 60 of adhesive material or solvent if desired. Ordinarily when applying an adhesive to the tear-resisting material it is also desirable at the same time to apply additional adhesive material to at least one of the webs of material and therefore I have shown a coating roll 58 in the apparatus of Fig. 16. However, it will of course be understood that the latter coating roll may be omitted if a sufficient number of threads, strips of other tear-resisting means are used. If relatively wide webs or strips of the tear-resisting agent are used and they are positioned sufficiently close together the area thereof may be sufficient to render unnecessary the use of adhesive on the sheets themselves to effect secure bonding of the upper and lower webs of material together. In cases where welding of the upper and lower webs takes place, the use of adhesive material may be omitted altogether or reduced to a minimum.

In Fig. 17 I have illustrated diagrammatically one type of mechanism adapted for use in producing a product such as that shown in Figs. 1 and 2. In this type of apparatus a single web of material is employed and the marginal portions of the web are folded over the tear-resisting agent onto the web. As shown, this apparatus includes a single roll of material 62 from which a web passes into contact with marginal coating rolls 64. Thread then passes from the spools 66 into engagement with the adhesive-coated portions of the web, and thereafter the edges of the web are folded over by members 68 and pressed into engagement with the body of the sheet and the tear-resisting agent by press rolls 70.

In forming products wherein the tear-resisting material is distributed irregularly, as in the forms of my invention illustrated in Figs. 12 and 13, it may be desirable either to scatter the material onto an adhesive-coated surface of a web of the sheet material by means of a suitable shaker screen or blower. If preferred, the material itself may be moistened or coated with an adhesive and sprinkled or scattered onto the web prior to pressing an upper layer of material into contact therewith. In an alternative procedure for distributing the tear-resisting agent irregularly throughout the product, the agent in more or less comminuted or disintegrated form is mixed with the adhesive and both are applied in the same operation by means of a coating roll. This procedure is especially adapted for applying materials such as wool flock, mica, etc.

In any of the products and methods of procedure described above the material from which the sheets are formed may be suitably decorated in any desired manner. A convenient way of producing attractive and decorative effects is to apply decorations or decorative substances to the material by spraying, sprinkling or blow coloring material onto one or more layers of the sheet, using, say two or three different colors as shown at 72 on Fig. 10. The globules or fine spray of color on the sheet are thus distributed more or less irregularly and frequently overlap giving very attractive effects. Similarly bronze or aluminum powder may be applied to the sheets and if the product is to be used for advertising purposes, material such as face powders, etc. may be applied to one or more sheets or confined between layers of the material.

Such decorative or utilitarian application of products embodying my invention and the methods of producing the same may be readily combined with the tear-resisting features of my invention or they may be used by themselves if desired.

The forms of my invention and the methods of producing the same which are described above are intended for illustrative purposes only, since it will be apparent that any one skilled in the art may resort to various changes in the form and arrangement of the elements and the manner of assembling or applying the same without departing from the spirit and scope of my invention.

What I claim is the following:

1. A flexible sheet comprising a layer of thin nonfibrous material having the tearing characteristics of regenerated cellulose and provided with means carried thereby for limiting or directing tears formed in the material, said means being in the form of a strip of material similar to that of which the sheet is formed presenting an edge in contact with said layer positioned to separate an area of the sheet designed to be readily torn from an area thereof to be protected from tears, said edge being more resistant to tearing than said layer and facing the area designed to be readily torn.

2. Flexible material comprising two sheets of nonfibrous transparent material having the tearing characteristics of regenerated cellulose and transparent and flexible elements of different colors located between said sheets and bonded thereto, said elements extending in intersecting lines and overlapping at the points of intersection to provide areas transmitting light differing in color from that of either said elements or said sheets.

3. Flexible material comprising two sheets of nonfibrous transparent material having the tearing characteristics of regenerated cellulose, and a plurality of transparent flexible tear resisting elements formed of material similar to that of which said sheets are formed and of colors differing from each other and from that of said sheets located between said sheets and bonded thereto, said elements extending in intersecting lines and overlapping at the points of intersection to provide area transmitting light differing in color from that of either said elements or said sheets.

4. Flexible material comprising a sheet of nonfibrous transparent material having the tearing characteristics of regenerated cellulose and a plurality of transparent flexible tear resisting elements of colors differing from each other and from that of said sheet bonded to said sheet and extending in intersecting lines and overlapping at the points of intersection to provide areas transmitting light differing in color from that of either said elements or said sheet.

5. Sheet material formed of regenerated cellulose provided with tear-resisting means positioned to limit or control the amount and character of tears that may be produced in the material, said tear-resisting means presenting a folded edge of material at least a portion of which is spaced from an edge of the sheet.

GERALD K. GEERLINGS.